Patented Mar. 2, 1943

2,312,688

UNITED STATES PATENT OFFICE 2,312,688

REACTION PRODUCT OF ALDEHYDES AND TRIAZINE DERIVATIVES

Gaetano F. D'Alelio, Pittsfield, Mass., assignor to General Electric Company, a corporation of New York No Drawing. Application July 30, 1941, Serial No. 404,661

18 Claims. (Cl. 260—72)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a triazine derivative corresponding to the following general formula:

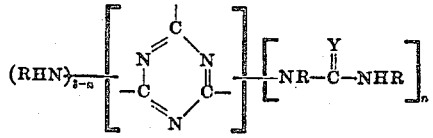

In the above formula $n$ represents an integer and is at least 1 and not more than 3, Y represents a member of the class consisting of oxygen and sulfur, and R represents a member of the class consisting of hydrogen and monovalent hydrocarbon and halo-hydrocarbon radicals, numerous examples of which hereafter are given. From a consideration of the formula it will be seen that when $n$ is 3 there will be no amino (—NHR) groups attached to the triazine nucleus. Instead of the ureido or thioureido symmetrical triazines (s-triazines) represented by the above formula, corresponding derivatives of the asymmetrical and vicinal triazines may be used.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc., including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlormethyl, dichlorphenyl, ethyl chlorphenyl, phenyl chlorethyl, bromethyl, brompropyl, bromtolyl, chlortolyl, etc. Preferably R is hydrogen.

More specific examples of ureido and thioureido triazines that may be employed in producing my new condensation products are the triureido 1,3,5-triazines, the tri-(thioureido) 1,3,5-triazines, the monoamino (—NHR) diureido 1,3,5-triazines, the monoamino (—NHR) di-(thioureido) 1,3,5-triazines, the diamino [(—NHR)₂] monoureido 1,3,5-triazines and the diamino [(—NHR)₂] mono-(thioureido) 1,3,5-triazines.

The ureido and thioureido triazines that are used in carrying the present invention into effect are more fully described and are specifically claimed in my copending application Serial No. 404,664, filed concurrently herewith and assigned to the same assignee as the present invention.

Other and more specific examples of ureido and thioureido triazines that may be used in producing my new condensation products are listed below:

2-ureido 4,6-diamino 1,3,5-triazine
2-ureido 4,6-di-(ethylamino) 1,3,5-triazine
2-(ethyl ureido) 4,6-diamino 1,3,5-triazine
2-ureido 4-amino 6-methylamino 1,3,5-triazine
2-ureido 4-phenylamino 6-amylamino 1,3,5-triazine
2-(N,N'-diethyl ureido) 4,6-diamino 1,3,5-triazine
2-(N-phenyl N'-methyl ureido) 4,6-di-(ethylamino) 1,3,5-triazine
2-(beta-chlorethyl ureido) 4,6-diamino 1,3,5-triazine
2-thioureido 4,6-diamino 1,3,5-triazine
2,4-diureido 6-amino 1,3,5-triazine
2,4,6-triureido 1,3,5-triazine
2-thioureido 4,6-di-(ethylamino) 1,3,5-triazine
2-thioureido 4-ethylamino 6-phenylamino 1,3,5-triazine
2-(ethyl thioureido) 4,6-di-(phenylamino) 1,3,5-triazine
2-(N,N'-diethyl thioureido) 4,6-diamino 1,3,5-triazine
2-(N-ethyl N'-phenyl thioureido) 4,6-diamino, 1,3,5-triazine
2,4-di-(thioureido) 6-amino 1,3,5-triazine
2,4,6-tri-(thioureido) 1,3,5-triazine The formulas for most of the above compounds are shown in my above-identified copending application Serial No. 404,664.

The present invention is based on my discovery that new and valuable materials of particular utility in the plastics and coating arts can be produced by effecting reaction between ingredients comprising essentially an aldehyde, including polymeric aldehydes and aldehyde-addition products, and triazines (more particularly the 1,3,5-triazines) containing at least one ureido (—NRCONHR) or thioureido (—NRCSNHR)

substituent group attached directly to a carbon atom of the triazine nucleus.

Resins heretofore have been made by condensing an aldehyde with an aminotriazine, e. g., melamine. Such resins have excellent heat and water resistance, but are deficient in other properties that are desirable in a resin to be used in the production of molding compounds and molded articles. The urea-aldehyde resins, on the other hand, have much better flow characteristics than the aminotriazine-aldehyde, specifically melamine-formaldehyde, resins but are less resistant to water. The resinous condensation products of the present invention have a high water resistance approximating that of the known aminotriazine-aldehyde resins plus the improved flow characteristics of the urea-aldehyde resins. Another property which is characteristic of my new resinous compositions is that they readily convert to an insoluble, infusible state at a higher pH than do the ordinary urea-aldehyde resins. As a result, the heat-convertible resins of this invention have better time- or storage-stability characteristics than the heat-convertible urea-aldehyde resins. The heat resistance of my new resins also is much better than the urea-aldehyde resins.

Thus it is seen that the present invention provides a resinous composition which has combined therein the desirable properties of the conventional aminotriazine-aldehyde and urea-aldehyde resins without sacrifice of other useful properties. This is a surprising and unexpected result that in no way could have been predicted. Because of the unique properties of the resins of this invention, they are suitable for molding and other applications for which the ordinary aminotriazine-aldehyde and urea-aldehyde resins are unsuited.

In carrying my invention into effect the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde-reactable, for instance, ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance, a carbonate, cyanide or hydroxide of an alkali metal (e. g., sodium, potassium, lithium, etc.)

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the ureido or thioureido triazine, or mixture of ureido triazine and thioureido triazine, may be carried out in the presence of solvents or diluents, fillers, other nautral or synthetic resinous bodies, or while admixed with other materials that also can react with the aldehydic reactant or with the triazine derivative, e. g., ketones, urea, thiourea, selenourea, iminourea (guanidine), substituted ureas, thioureas, selenoureas and iminoureas, numerous examples of which are given in my various copending applications, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the ureido and thioureido triazines constituting the primary components of the resins of the present invention, e. g., melamine, ammeline, ammelide, numerous other examples being given in my various copending applications, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent 2,239,441; monohydric and polyhydric alcohols, e. g., butyl alcohol, amyl alcohol, ethylene glycol, glycerine, polyvinyl, etc.; amines, including aromatic amines, e. g., aniline, etc.; and the like. These modifying reactants may be incorporated with the triazine derivative and the aldehyde by mixing all the reactants and effecting condensation therebetween or by various permutations of reactants as described, for example, in my copending application Serial No. 363,037, filed October 26, 1940, with particular reference to reactions involving a urea, an aldehyde and a semiamide of oxalic acid. For instance, I may form a partial condensation product of ingredients comprising urea or melamine, a ureido or thioureido triazine of the kind herein described (for example, 2-ureido 4,6-diamino 1,3,5-triazine) and an aldehyde, including polymeric aldehydes and aldehyde-addition products, for instance formaldehyde, paraformaldehyde, dimethylol urea, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation while others are thermosetting or potentially thermosetting bodies that convert under heat or under heat and pressure to an insoluble, infusible state. The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention show excellent flow characteristics during a short curing cycle. This is a property that is particularly desirable in a molding compound. The molded resins are exceptionally light in color. Products of any desired colors can be obtained by incorporating a suitable pigment into the molding compound. The molded articles have good surface finish and excellent resistance to water and arcing. They have a high dielectric strength. The pH at which the heat-curable resins of this invention cure generally is of the order of 5.0 to 8.0 or higher. Basic fillers such as asbestos, therefore, can be used satisfactorily in the production of molding compounds without detrimental effect upon the rapidity of cure of the compound.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

|  | Mol ratios | Parts |
| --- | --- | --- |
| 2-ureido 4,6-diamino 1,3,5-triazine | 1.0 | 16.9 |
| Aqueous formaldehyde (approx. 37.1% HCHO) | 4.0 | 32.4 |
| Sodium hydroxide in 1 part water |  | 0.02 | were heated together under reflux at the boiling temperature of the mass for 15 minutes. The resulting resinous syrup was clear while hot and had a pH of 8.62. This syrup was potentially heat-curable as evidenced by the fact that when samples of it, containing various curing catalysts or curing reactants, for example chloracetamide, glycine, citric acid, etc., were heated on a 140° C. hot plate, the resin cured to a hard, infusible state.

To 23 parts of the syrup produced as above described was added 0.1 part chloracetamide and the mixture was then heated under reflux at boiling temperature for 10 minutes to cause the chloracetamide to intercondense with the partial condensation product of the triazine derivative and formaldehyde. A molding (moldable) compound was made from the resulting syrup by mixing it with 7 parts alpha cellulose in flock form and 0.04 part of a mold lubricant, specifically zinc stearate, and the wet compound then was dried at 72° C. for one hour. A sample of the dried compound was molded at 130° C. under a pressure of 2,000 pounds per square inch, yielding a well-cured molded article having a smooth, glossy surface appearance. The molding compound showed excellent flow characteristics during molding. The molded article also has excellent water resistance as shown by the fact that, when immersed in boiling water for 15 minutes and then in cold water for 5 minutes, it absorbed only 0.31% by weight of water.

Instead of using chloracetamide, glycine or citric acid as above described in accelerating the curing of the potentially reactive resinous material, heat-convertible compositions may be produced by adding to the syrup direct or active curing catalysts other than citric acid (for example, phthalic anhydride, malonic acid, oxalic acid, etc.), or latent curing catalysts (e. g., sodium chloracetate, N-diethyl chloracetamide, glycine ethyl ester hydrochloride, etc.) or by the intercondensation with curing reactants other than chloracetamide (monochloracetamide) and glycine (e. g., di- and tri-chloracetamides, chloracetonitriles, alpha, beta-dibrompropionitrile, aminoacetamide hydrochloride, aminoacetonitrile hydrochloride, ethylene diamine monohydrochloride, diethanolamine hydrochloride, nitrourea, chloracetyl urea, chloracetone, citric diamide, phenacyl chloride, etc. Other examples of active and latent curing catalysts and of curing reactants that may be employed to accelerate or to effect the curing of the thermosetting or potentially thermosetting resins of this and other examples are given in various copending applications of mine, for instance in copending application Serial No. 346,962, filed July 23, 1940, and Serial No. 354,395, filed August 27, 1940, both of which applications are assigned to the same assignee as the present invention.

*Example 2*

|  | Parts |
| --- | --- |
| 2-ureido 4,6-diamino 1,3,5-triazine | 1.69 |
| Aqueous formaldehyde (approx. 37.1% HCHO) | 32.4 |
| Urea | 10.8 |
| Sodium hydroxide in 1 part water | 0.02 | were heated together under reflux at boiling temperature for 20 minutes. The resulting syrup had a pH of 7.95 and cured rapidly to an insoluble, infusible state when small samples of it were treated with various substances such as described under Example 1, specifically citric acid, glycine and chloracetamide, and the resulting product then heated on a 140° C. hot plate.

Molding compound and molded articles were produced from a chloracetamide-containing syrup that was prepared as described under Example 1. The procedure followed in making the molding compound and molded pieces also was the same as in Example 1 with the exception that the wet compound required a longer drying period (2 hours and 35 minutes) at 72° C. before the compound was sufficiently dry for satisfactory molding. The molded article was well cured.

Example 3

| | Parts |
|---|---|
| 2-ureido 4,6-diamino 1,3,5-triazine | 1.69 |
| Aqueous formaldehyde (approx. 37.1% HCHO) | 32.4 |
| Thiourea | 13.68 |
| Sodium hydroxide in 1 part water | 0.02 | were heated together under reflux for 15 minutes, yielding a clear syrup having a pH of 7.82. Molding compound and molded articles were prepared from this syrup into which had been intercondensed chloracetamide as described under Example 1. The time of drying the wet molding compound was 2 hours. A molded article produced from a sample of the dried compound was well cured throughout and had good water resistance, as evidenced by the fact that it absorbed only 2.83% by weight of water when tested for its water-absorption characteristics as described under Example 1.

Example 4

| | Mol ratios | Parts |
|---|---|---|
| 2-ureido 4,6-diamino 1,3,5-triazine | 0.1 | 1.69 |
| Aqueous formaldehyde (approx. 37.1% HCHO) | 3.0 | 24.30 |
| Melamine | 0.9 | 11.34 |
| Sodium hydroxide in 1 part water | | 0.02 |

The above components were heated together under reflux for 15 minutes, yielding a syrup having a pH of 9.5. The addition of various curing catalysts and curing reactants such as described under Example 1, specifically chloracetamide, glycine, sulfamic acid, chloracetonitrile and citric acid, to samples of the syrup resulted in the production of resinous materials that cured readily to an insoluble, infusible state at 140° C.

Molding compound and molded articles were prepared from the above syrup into which had been intercondensed chloracetamide as described under Example 1. The same procedure was followed in making the molding compound and molded pieces as set forth under Example 1 with the exception that the time of drying the wet compound was one hour and 30 minutes at 72° C. The molded article was well cured, had a good surface appearance and excellent resistance to water, as evidenced by the fact that it absorbed only 0.46% by weight of water when tested for its water-absorption characteristics as described under Example 1.

Example 5

| | Parts |
|---|---|
| 2-ureido, 4,6-diamino 1,3,5-triazine | 8.45 |
| Dimethylol urea (containing approx. 11% by weight water) | 18.0 |
| Sodium hydroxide in 1 part water | 0.02 |
| Water | 25.0 | were heated together under reflux for 15 minutes, yielding a syrup having a pH of 8.1. Chloracetamide, glycine, citric acid and other curing agents caused samples of this syrup to cure rapidly to an insoluble, infusible state when heated on a 140° C. hot plate.

One-tenth (0.1) part chloracetamide was intercondensed into 23 parts of the above-described reaction product of dimethylol urea and 2-ureido 4,6-diamino 1,3,5-triazine as mentioned under Example 1. The resulting syrup was mixed with 7 parts alpha flock and 0.04 part zinc stearate to yield a molding compound which thereafter was dried for 2 hours and 23 minutes at 72° C. A sample of the dried compound was molded at 130° C. under a pressure of 2,000 pounds per square inch, resulting in a well-cured molded piece that showed excellent flow characteristics during molding. The molded piece was especially resistant to water, as shown by the fact that it absorbed only 0.75% by weight of water when tested for its water resistance as described under Example 1.

Example 6

| | Mol ratios | Parts |
|---|---|---|
| 2-ureido 4,6-diamino 1,3,5-triazine | 0.5 | 8.45 |
| Para-toluene sulfonamide | 0.5 | 8.56 |
| Aqueous formaldehyde (approx. 37.1% HCHO) | 2.5 | 20.3 |
| Sodium hydroxide in 1 part water | | 0.02 | were heated together under reflux at the boiling temperature of the mass for 15 minutes. During the reflux period a small amount of very viscous resin was precipitated. Chloracetamide was intercondensed with the reaction mass as described under Example 1 with the exception that the reflux period after adding the chloracetamide was only 5 minutes instead of 10 minutes as in Example 1. The same procedure was followed in making a molding compound and molded articles from the chloracetamide-containing syrup as given in Example 1, with the exception that the time of drying the wet molding compound was one hour and 50 minutes at 72° C. A molded disk produced from a sample of the dried compound was well cured throughout, had a good surface appearance and was quite translucent as evidenced by the fact that it transmitted 28% of the maximum light transmittible when tested for light transmission in a double-sphere photometer.

Example 7

| | Mol ratios | Parts |
|---|---|---|
| 2-ureido 4,6-diamino 1,3,5-triazine | 0.5 | 8.45 |
| Sulfanilamide urea (para-ureido benzene sulfonamide) | 0.5 | 10.80 |
| Aqueous formaldehyde | 3.0 | 24.30 |
| Sodium hydroxide in 1 part water | | 0.02 |

The above components were heated together under reflux for 15 minutes, yielding a syrup having a pH of 8.2. This syrup was potentially heat-curable as shown by the fact that when treated with various curing agents, specifically chloracetamide and sulfamic acid, it cured rapidly to an insoluble, infusible state at 140° C.

Molding compound and molded articles were produced as described under Example 1 with the exception that the time of drying the wet molding compound at 72° C. was only 50 minutes. The molded pieces were well cured throughout.

Example 8

A phenol-formaldehyde partial condensation product was produced by heating together the following components at 50° C. for 4 hours in a reaction vessel provided with a reflux condenser:

| | Parts |
|---|---|
| Synthetic phenol | 4.5 |
| Aqueous formaldehyde (approx. 37.1% HCHO) | 9.75 |
| Potassium carbonate in 1 part water | 0.143 |

To this reaction product was added 0.45 part of 2-ureido 4,6-diamino 1,3,5-triazine and the resulting mixture was heated under reflux for 30 minutes. At the end of this period of time the syrup thereby obtained was acidified by the addition of 0.243 part oxalic acid in 5 parts water. A molding compound was made from the acidified syrup by mixing it with 5.7 parts alpha cellulose in flock form and 0.05 part zinc stearate. The wet molding compound was dried at room temperature for 63 hours. A sample of the dried compound was molded at 135° C. under a pressure of 2,000 pounds per square inch, yielding a molded piece that was well cured throughout, was very light in color and showed good flow characteristics during molding. The water resistance of the molded article was very good, as shown by the fact that it absorbed only 1.52% by weight of water when tested for water absorption as described under Example 1.

*Example 9*

|  | Mol ratios | Parts |
|---|---|---|
| 2-ureido 4,6-diamino 1,3,5-triazine | 0.9 | 7.60 |
| Acetamide | 0.1 | 0.30 |
| Aqueous formaldehyde (approx. 37.1% HCHO) | 4.0 | 16.20 |
| Sodium hydroxide in 0.5 part water | | 0.01 | were heated together under reflux for 10 minutes, yielding a clear, very viscous syrup. Chloracetamide and other curing agents such as described under Example 1 caused the syrup to convert to an insoluble, infusible resin when heated at 140° C.

*Example 10*

|  | Mol ratios | Parts |
|---|---|---|
| 2-ureido 4,6-diamino 1,3,5-triazine | 1.0 | 8.45 |
| Butyl alcohol | 5.0 | 18.5 |
| Aqueous formaldehyde (approx. 37.1% HCHO) | 4.0 | 16.2 |
| Sodium hydroxide in 0.5 part water | | 0.01 | were heated together under reflux for 15 minutes, yielding a clear, very viscous syrup. Chloracetamide, citric acid, glycine and other curing agents such as described under Example 1, when added to this syrup and the resulting mixture then heated on a 140° C. hot plate, caused the syrup to cure to a hard, infusible resin. A portion of the unmodified syrup, that is, the syrup to which no curing agent had been added, was dehydrated by heating it on a steam plate. The dehydrated syrup was insoluble in water but was soluble in solvents such, for example, as ethyl alcohol and a fifty-fifty solution of ethyl alcohol and Solvatone. The solubility and film-forming characteristics of this resin make it especially suitable for use in the production of spirit and baking varnishes. For example, it may be used to advantage as a modifier of varnishes of the aminoplast and alkyd-resin types.

*Example 11*

|  | Mol ratios | Parts |
|---|---|---|
| 2-ureido, 4,6-diamino 1,3,5-triazine | 1.0 | 8.45 |
| Diethyl malonate | 1.0 | 8.0 |
| Aqueous formaldehyde (approx. 37.1% HCHO) | 4.0 | 16.2 |
| Sodium hydroxide in 0.5 part water | | 0.01 | were heated together under reflux at boiling temperature for 15 minutes. During the reflux period a small amount of a clear resin was precipitated. When the reaction product was treated with a small amount of curing agents such as described under Example 1, specifically chloracetamide, sulfamic acid and phenacyl chloride, and the resulting product heated at 140° C., a cured resin of extreme toughness and flexibility was obtained.

*Example 12*

|  | Mol ratios | Parts |
|---|---|---|
| 2-ureido 4,6-diamino 1,3,5-triazine | 1.0 | 8.45 |
| Glycerine | 0.5 | 2.30 |
| Aqueous formaldehyde (approx. 37.1% HCHO) | 4.0 | 16.20 |
| Sodium hydroxide in 0.5 part water | | 0.01 |

The above components were heated together under reflux for 15 minutes, yielding a clear syrup having a pH of 8.07. This reaction product was heat-convertible, as evidenced by the fact that curing agents such as described under Example 1 converted the product to a tough, infusible resin upon heating at 140° C. The heat-convertible resin may be used to advantage in the production of varnish compositions. A sample of the resin was treated with a curing agent and a film of the resulting product then applied to a glass plate, which thereafter was baked for several hours at 72° C. The baked film was transparent, tough and adhered tightly to the glass surface.

*Example 13*

| | Parts |
|---|---|
| 2-ureido 4,6-diamino 1,3,5-triazine | 0.43 |
| Solution of a glyceryl phthalate resin (43% of solid resin) | 10.0 |
| Butyl alcohol | 5.0 | were heated together under reflux for one hour. The resulting syrup yielded a heat-cured resin when treated with various curing agents such as described under Example 1, specifically glycine and sulfamic acid, and the resulting mixture then heated at 140° C.

*Example 14*

|  | Mol ratios | Parts |
|---|---|---|
| 2-ureido 4, 6-diamino 1, 3, 5-triazine | 1.0 | 8.45 |
| Furfural | 4.0 | 19.20 |
| Sodium hydroxide in 1 part water | | 0.02 | were heated together under reflux for 20 minutes, yielding a syrup having a pH of 5.55. This syrup was convertible to an infusible resin when heated at 140° C. in the absence of a curing agent. However, the addition of active or latent curing catalysts or intercondensation with curing reactants such as described under Example 1 accelerated the curing of the heat-curable resin to an insoluble and infusible state.

*Example 15*

|  | Mol ratios | Parts |
|---|---|---|
| 2-ureido 4,6-diamino 1,3,5-triazine | 1.0 | 8.45 |
| Acrolein | 4.0 | 11.20 |
| Sodium hydroxide in 1 part water | | 0.02 | were heated together under reflux for 15 minutes. The resulting syrup cured at 140° C. to a hard resin in the absence of active or latent curing catalysts or curing reactants. The addition of such curing agents accelerated the curing of the resin to an infusible, insoluble state.

Instead of 2-ureido 4,6-diamino 1,3,5-triazine mentioned in the above examples, equivalent amounts of any of the other ureido or thioureido 1,3,5-triazines described herein and in my copending application Serial No. 404,664, filed concurrently herewith, may be employed, for example: 2,4,6-triureido 1,3,5-triazine; 2,4,6-tri-(thioureido) 1,3,5-triazine; 2-thioureido 4,6-diamino 1,3,5-triazine; 2,4-diureido 6-amino 1,3,5-triazine; 2,4-di-(thioureido) 6-amino 1,3,5-triazine; etc.

The following examples illustrate the results obtained when melamine-formaldehyde and urea-formaldehyde resins are used in the production of molding compounds:

Example 16

| | Mol ratios | Parts |
|---|---|---|
| Melamine | 1.0 | 12.6 |
| Aqueous formaldehyde (approx. 37.1% HCHO) | 4.0 | 32.4 |
| Sodium hydroxide in 1 part water | | 0.02 | were heated together under reflux at the boiling temperature of the mass for 15 minutes, yielding a syrup having a pH of 8.75. Twenty-three (23) parts of the resulting syrup and 0.1 part chloracetamide were heated together under reflux for 10 minutes, that is, in the same manner as described under Example 1. The resulting product was made into a molding compound and a sample of the dried compound molded under heat and pressure, likewise in the same manner as described under Example 1. The molded piece showed approximately the same resistance to water (0.2% by weight water absorbed on a water-absorption test) as the molded product resulting from the resin of Example 1, but was much more resistant to flow during molding than the resin of Example 1. This means that the resin of Example 1 would be much more suitable for use in making molding compounds that are to be used in the production of molded articles of intricate design than would molding compounds made from the melamine-formaldehyde resin of this example.

Example 17

| | Mol ratios | Parts |
|---|---|---|
| Urea | 1.0 | 12.0 |
| Aqueous formaldehyde (approx. 37.1% HCHO) | 4.0 | 32.4 |
| Sodium hydroxide in 1 part water | | 0.02 | were heated together under reflux at the boiling temperature of the mass for 30 minutes, yielding a syrup having a pH of 8.35. Chloracetamide was caused to react with a portion of this syrup as described under Example 1. Molding compound and molded articles were made from the resulting product likewise as described under Example 1 with the exception that the time of drying the wet molding compound at 72° C. was one hour and 25 minutes. The molded piece absorbed 8.21% by weight of water when tested for water-absorption characteristics as described under Example 1. In marked contrast the molded article of Example 1 showed only 0.31% by weight of water absorbed.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, substituted ureas, thioureas, selenoureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and aldehyde-addition products may be employed, e. g., mixtures of formaldehyde and methylol compounds such, for instance, as dimethylol urea and trimethylol melamine.

The ratio of the aldehydic reactant to the triazine derivative may be varied over a wide range, but ordinarily the reactants are employed in an amount corresponding to at least one mol of the aldehyde, specifically formaldehyde, for each mol of the triazine derivative. Thus I may use, for example, from one to five or six mols of an aldehyde for each mol or triazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acryloamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloracetonitriles, etc.; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with the aminodiazines (e. g., 2,4,6-triaminopyrimidine, 2,4-diaminoquinazoline, etc.), with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a ureido triazine or a thioureido triazine of the kind herein described and an aldehyde, e. g., formaldehyde, I may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloracetic, propionic, butyric, valeric, acrylic, polyacrylic, methacrylic, polymethacrylic, oxalic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100°–200° C. and at pressures of the order of 1,000 to 5,000 pounds or more per square inch.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a triazine derivative corresponding to the general formula

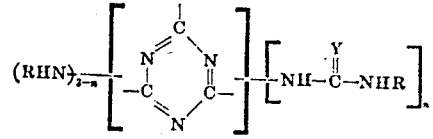

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

2. A composition as in claim 1 wherein the aldehyde is formaldehyde.

3. A composition comprising a condensation product of ingredients comprising an aldehyde and a triazine derivative corresponding to the general formula

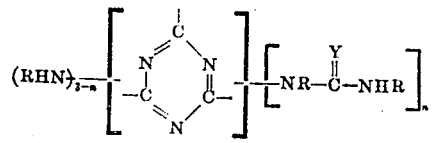

where $n$ is an integer and is at least 1 and not more than 3, Y is a member of the class consisting of oxygen and sulfur, and R represents hydrogen.

4. A composition comprising a condensation product of ingredients comprising an aldehyde and a triazine derivative corresponding to the general formula

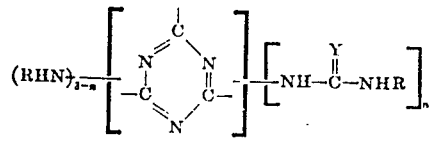

where $n$ is 1, Y is a member of the class consisting of oxygen and sulfur, and R represents hydrogen.

5. A composition as in claim 4 wherein the aldehyde is formaldehyde.

6. A resinous composition comprising the product of reaction of ingredients comprising 2,4,6-triureido 1,3,5-triazine and an aldehyde.

7. A resinous composition comprising the product of reaction of ingredients comprising 2-ureido 4,6-diamino 1,3,5-triazine and formaldehyde.

8. A resinous composition comprising the product of reaction of ingredients comprising formaldehyde and 2-thioureido 4,6-diamino 1,3,5-triazine.

9. A heat-curable resinous condensation product of ingredients comprising formaldehyde and a triazine derivative corresponding to the general formula

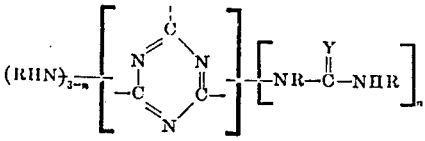

where $n$ is an integer and is at least 1 and not more than 3, R represents hydrogen and Y represents oxygen.

10. A product comprising the heat-cured resinous composition of claim 9.

11. A composition as in claim 1 wherein the reaction product is an alkaline-catalyzed reaction product of the stated components.

12. A composition as in claim 1 wherein the reaction product is an alcohol-modified reaction product of the stated components.

13. A composition comprising the product of reaction of ingredients comprising a urea, an aldehyde and a triazine derivative corresponding to the general formula

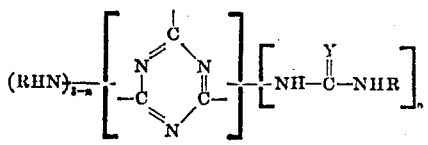

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

14. A heat-curable resinous composition comprising (1) a partial condensation product of ingredients comprising 2-ureido 4,6-diamino 1,3,5-triazine and formaldehyde and (2) a curing reactant.

15. A heat-curable composition comprising the heat-convertible product of reaction of (1) a partial condensation product of ingredients comprising urea, 2-ureido 4,6-diamino 1,3,5-triazine and formaldehyde and (2) a chlorinated acetamide.

16. A product comprising the heat-cured composition of claim 15.

17. A resinous reaction product of ingredients comprising dimethylol urea, 2-ureido 4,6-diamino 1,3,5-triazine and chloracetamide.

18. The method of preparing new condensation products which comprises effecting reaction between ingredients comprising an aldehyde and a triazine derivative corresponding to the general formula

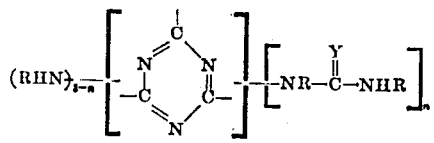

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

GAETANO F. D'ALELIO.

Certificate of Correction

Patent No. 2,312,688.                                             March 2, 1943.

GAETANO F. D'ALELIO

It is hereby certified that errors appear in the printed specification of the above numbered patent requiring correction as follows: Page 1, second column, line 39, strike out the comma after "4,6-diamino"; page 2, first column, line 26, for the words "better than the" read *better than that of the*; and second column, line 13, for "nautral" read *natural*; line 44, after "polyvinyl" and before the comma insert *alcohol*; page 3, second column, line 14, for "has" read *had*; line 29, strike out "the" before "intercondensation"; page 4, first column, line 56, strike out the comma after "2-ureido"; page 5, first column, line 54, for "dehydrtaed" read *dehydrated*; line 70, strike out the comma after "2-ureido"; page 6, second column, line 47, for "each mol or" read *each mol of*; page 7, second column, lines 14 and 45, and page 8, first column, line 15, claims 1, 4 and 13 respectively, for that portion of the formula reading

and that the said Letters Patent should be read with these corrections therein that the same may conform to the record of the case in the Patent Office.

Signed and sealed this 8th day of June, A. D. 1943.

[SEAL]

HENRY VAN ARSDALE,
*Acting Commissioner of Patents.*